(12) United States Patent
Dixon et al.

(10) Patent No.: US 10,365,125 B2
(45) Date of Patent: Jul. 30, 2019

(54) ROTARY ENCODER

(71) Applicant: TRW Limited, Solihull, West Midlands (GB)

(72) Inventors: Christopher David Dixon, Coventry West Midlands (GB); Connel Brett Williams, Leamington Spa West Midlands (GB)

(73) Assignee: TRW Limited, Solihull, West Midlands (GB)

( * ) Notice: Subject to any disclaimer, the term of this patent is extended or adjusted under 35 U.S.C. 154(b) by 579 days.

(21) Appl. No.: 14/904,482

(22) PCT Filed: Jul. 10, 2014

(86) PCT No.: PCT/GB2014/052112
§ 371 (c)(1),
(2) Date: Jan. 12, 2016

(87) PCT Pub. No.: WO2015/004472
PCT Pub. Date: Jan. 15, 2015

(65) Prior Publication Data
US 2016/0146638 A1    May 26, 2016

(30) Foreign Application Priority Data
Jul. 12, 2013 (GB) .................................. 1312484.7

(51) Int. Cl.
*G01D 5/244* (2006.01)
*G01D 5/14* (2006.01)
*G01D 18/00* (2006.01)

(52) U.S. Cl.
CPC ........... *G01D 5/2449* (2013.01); *G01D 5/142* (2013.01); *G01D 18/008* (2013.01)

(58) Field of Classification Search
CPC ..... G01D 5/2449; G01D 5/142; G01D 18/008
See application file for complete search history.

(56) References Cited

U.S. PATENT DOCUMENTS

2003/0052260 A1* 3/2003 Grimes .............. G01D 5/34707
                                                                250/231.13
2003/0141864 A1    7/2003 Babin
(Continued)

FOREIGN PATENT DOCUMENTS

EP    1630363 A1    3/2006
EP    2559971 A1    3/2011
(Continued)

OTHER PUBLICATIONS

Patents Act 1977: Search Report under Section 17(5), Application No. GB1312484.7, dated Sep. 18, 2013.
(Continued)

*Primary Examiner* — Daniel R Miller
(74) *Attorney, Agent, or Firm* — MacMillan, Sobanski & Todd, LLC

(57) ABSTRACT

A rotary encoder assembly comprises an annular track comprising an alternating pattern of at least two different encoding regions; a first detector and a second detector each arranged to produce a respective alternating output signal as the track of encoding regions rotates about its axis past the detector, the combined values of the two output signals assuming a plurality of unique states with the states changing from one to another as the encoder rotates. A memory stores compensation values, each value being associated with a respective one of the possible state changes that can occur when the combined values of the two output signals change upon movement of the encoder track, and each indicative of an average error in the position at which the corresponding change of state occurs. A processing means in use generates a position signal that is updated when there is a change in the combined states of the output signals of the two detectors, the position signal being corrected by an
(Continued)

amount indicated by the compensation value associated with the latest change in state.

19 Claims, 8 Drawing Sheets

(56) References Cited

U.S. PATENT DOCUMENTS

| | | | |
|---|---|---|---|
| 2006/0042074 A1 | 3/2006 | Stork et al. | |
| 2008/0173802 A1 | 7/2008 | Chiu | |
| 2011/0187355 A1* | 8/2011 | Dixon | G01D 5/145 |
| | | | 324/207.25 |

FOREIGN PATENT DOCUMENTS

| | | |
|---|---|---|
| JP | H03175319 A | 7/1991 |
| WO | 2008020231 A2 | 2/2008 |
| WO | 2010150416 A1 | 12/2010 |
| WO | 2013098803 A1 | 7/2013 |
| WO | 2015004472 A2 | 1/2015 |

OTHER PUBLICATIONS

International Search Report and Written Opinion, Application No. PCT/GB2014/052112, dated Jan. 29, 2015.

\* cited by examiner

ROTARY ENCODER

CROSS-REFERENCE TO RELATED APPLICATIONS

This application is a national stage of International Application No. PCT/GB2014/052112, filed Jul. 10, 2014, the disclosures of which are incorporated herein by reference in entirety, and which claimed priority to Great Britain Patent Application No. 1312484.7, filed Jul. 12, 2013, the disclosures of which are incorporated herein by reference in entirety.

BACKGROUND OF THE INVENTION

This invention relates to improvements in encoders, especially rotary encoders, to methods of determining the position of an object using a rotary encoder, and to steering systems for vehicles that incorporate rotary encoders.

It is known to provide an encoder which comprises a track of magnetic elements arranged in an alternating sequence of North and South poles, and a detector which produces an output signal having a first state when proximal to one of the north poles and a second state when opposite one of the south poles. This, as the track moves past the detector the output of the detector will be a modulated signal which alternates between the first and second states.

An encoder with one detector is limited in use as it is not possible to tell which direction the track is moving. This can be overcome by using two detectors, offset from one another by an amount that is less then the spacing between centre of a north pole and the centre of an adjacent south pole. This is shown in FIGS. 2 and 3 of the accompanying drawings. The two detectors are typically identical, each producing an alternating sequence of first and second states as the track moves but with the two patterns offset from one another.

The combined values of the two outputs from the detectors will pass through four states, as shown by the state machine in FIG. 7 of the drawings, and by identifying the states before and after the latest change of state it is possible to identify the direction in which the track is rotating. Each change of state will occur as the detector crosses an edge where two adjacent poles meet. If the magnetic poles are all equal length these edges will be evenly spaced apart around the track, and if the detectors are spaced apart by an angle equal to half of the spacing between pole centres the states will change at regular, equally spaced, time intervals, when the track rotates at a constant velocity. The velocity can therefore be determined from the elapsed time between each change in state.

The change of state will not, by itself, uniquely identify the position of the encoder track if the track has many poles which will always be the case in a practical encoder. Over one full rotation, a given change of state will occur multiple times and this will be repeated on further revolutions of the encoder. However, by counting the changes in state, it is also possible to produce a position signal relative to a known datum position.

It is known that encoders of this form suffer from inaccuracies if the spacing between the magnets is not ideal or if external influences such as other magnets, cause distortion in the magnetic fields emitted by the magnets as seen by the detectors. Variations in the switching threshold of the detectors can also lead to inaccuracies. This can lead to small shifts in the position at which the combined output signals change state away from the expected positions. For example, in the case where the changes should occur at equal time intervals when the track is rotating at a constant velocity as described above, the error can lead to different timings between the changes in state as the changes occur at positions that are offset from the ideal expected positions.

The applicant has found that such shifts in the position of the changes of state of a rotating encoder track can lead to the presence of unwanted harmonic frequencies in the position signal output from the encoder. For example, where the encoder track comprises an annular disc of 36 magnets, rotating at a constant angular velocity, a noise component of the 36th order may be observed. When the position signal is being used in a sensitive application, such as within the control loop of a motor control circuit for a motor of an electric power assisted steering system, this noise can cause acoustic noise where the harmonic frequency interacts with the resonant frequency of a part of the motor or other part of the steering system.

BRIEF SUMMARY OF THE INVENTION

According to a first aspect the invention provides a rotary encoder assembly comprising:
an annular track comprising an alternating pattern of at least two different encoding regions,
a first detector at a first fixed position which is arranged to produce a first alternating output signal as the track of encoding regions rotates about its axis past the detector, the state of the output signal depending on which of the two different encoding regions is facing the first detector;
a second detector at a second fixed position which is offset from the position of the first detector and is arranged to produce a second alternating output signal as the track of encoding regions rotates about its axis past the detector, the state of the output signal depending on which of the two different encoding regions is facing the second detector;
in which the combined values of the two output signals is capable of assuming a plurality of unique states with the states changing from one to another as the encoder rotates,
characterised by further comprising:
a memory which stores compensation values, each value being associated with a respective one of the possible state changes that can occur when the combined values of the two output signals change upon movement of the encoder track, and in which each compensation value is indicative of an average error in the position at which the corresponding change of state occurs, and
a processing means which in use generates a position signal that is updated when there is a change in the combined states of the output signals of the two detectors, the position signal being corrected by an amount indicated by the compensation value associated with the latest change in state.

The invention therefore provides an encoder which includes a memory that stores compensation values associated with the changes of state, or transitions. These stored values are used to correct a position signal when it is updated on the occurrence of a respect one of the changes of state, or transition, of the combined output signals. Using compensation values that represent an average error in the position of a change it has been found that a position signal can be produced in which the level of harmonics is greatly reduced or even completely eliminated.

Each stored compensation value may be derived from observing multiple instances of the corresponding change of state of the combined output signals from the two detectors, the multiple observations being combined to provide an arithmetic average value that is stored as the compensation value.

Each stored compensation value may be indicative of the error in the relative position of a state change, i.e. a transition between states, to the position of one state change which is chosen as a reference change in state. The error may therefore be expressed in terms of a mechanical angular value, or an electrical angular error value. Any one of the changes in state may be selected as the reference change in state.

The processing means may include means adapted to update the stored compensation values by performing the steps of:
  recording, in the memory (or a different memory) the relative timing at which each change in state in a complete cycle of changes of state occurs, a cycle corresponding to each state changing at least once,
  determining the total time taken for all changes to occur starting with a first change in state and ending when that first change in state occurs again,
  determining the fraction of that total time between each change in state,
  deriving a compensation value for each change in state apart from the first change in state based on the fraction and the total elapsed time; and
  subsequently determining an intermediate compensation value for the first change in state which results in the sum of all of the compensation values being equal to zero.

The encoder may be arranged to update the stored compensation values by combining them with the intermediate compensation value. For instance, the update may comprise forming a weighted sum of the stored value and the intermediate value.

The average may therefore be an average for several cycles of the state machine, i.e. one repeat of the transitions.

The encoder may be arranged to perform the update when the encoder is rotating above a minimum threshold angular velocity. In order to function correctly, the encoder must be rotating at a constant velocity during the time of capture.

The processor may increment the position signal in the event that a change of state occurs which is associated with rotation of the encoder in a first direction, and may decrement the position signal when a change of state occurs that is associated with rotation is a second, opposite, direction.

The encoder may comprise Nep encoding regions, and they may be spaced equally from adjacent encoding regions. There may be two types of encoding regions arranged in an alternating pattern, each of the detectors producing a different response depending on which type it sees. For instance one type may be a North pole and the other a south pole, the detector being perhaps a Hall Effect sensor.

The centre of each region may be spaced from the next region by 360/Nep degrees. Where Nep is greater than two, then each change in state of the combined output signals of the detectors will occur at least twice in each full rotation, allowing a mean value to be calculated and stored in the memory.

The two detectors may be offset angularly by ¼*360/Nep degrees.

The encoder may be associated with a motor and used to produce a motor position signal indicating the mechanical or electrical position of the motor. The processing means may then generate the position signal from the count signal by the following equation:

position=MOD 360(count signal value×360°×$Np$/(4×$Nep$))+stored compensation value;

where position in the electrical position, stored compensation value is the value in the memory associated with the latest change in state, Nep is the number of encoder poles, and Np is the number of rotor magnet pole pairs which defines the number of electrical cycles per mechanical revolution of the motor.

Where there are two detectors, the value of the two output signals will adopt four unique states, giving four corresponding unique changes of state that each occur once over a machine state cycle but occur many times during each rotation of the encoder.

The memory may therefore store only four mean position error values, one for each transition. Storing only four values, one per change in state, uses far less memory than would be required if a position error value was to be stored for every possible position of the encoder. For instance, with 36 poles and 2 sensors with 2 states per sensor there would need to be 36×2×2=144 values stored, rather than 4, giving a saving of a factor of 36. The time to learn all of these values would also be greater.

The encoding regions of the encoder may each be defined by a pole of a magnet, the poles being arranged as an alternating pattern of north and south poles. The encoder detector may then comprise a Hall Effect sensor or other device that is sensitive to magnetic fields.

Other types of encoding region can be used, but in each case it is preferred that there are two different basic encoding regions that are arranged in an alternating pattern around the encoder track. For instance, the encoding regions may comprise two different colour patches, such as red and green, arranged in an alternating pattern or red-green-red-green-etc, for use with an optical detector that produces an output signal having a first value when it sees red and a second value when it sees green.

The detector may produce an output signal of a first value when facing a North pole and a second value when facing a south pole. The state will therefore change as the magnets move past the detector.

The encoder may include more than two detectors, for instance three or four detectors, and in such as case the combined output signal may have more than the four possible state changes that are present with an encoder having two detectors. For instance, with three detectors there will be eight different changes of state. The memory may store one calibration value for each of the different changes of state.

The encoder calibration and compensation described in this application may therefore be extended out to the calibration and compensation of any position sensor which uses two or more sensors together with a track of encoding regions. The term encoder should be interpreted broadly to cover any sensor which converts a position into an electrical signal, and may be extended to include linear encoders as well as rotary encoders.

According to a second aspect the invention provides a method of method of calibrating a rotary encoder of the kind comprising an annular track of at least two different encoding regions which alternate around the track,
  a first detector at a first fixed position which is arranged to produce a first alternating output signal as the track of encoding regions rotates about its axis past the detector, the state of the output signal depending on which of the two different encoding regions is facing the first detector;

a second detector at a second fixed position which is offset from the position of the first detector and is arranged to produce a second alternating output signal as the track of encoding regions rotates about its axis past the detector, the state of the output signal depending on which of the two different encoding regions is facing the second detector; and A processing means which generates a position signal at least in part by counting changes in the combined states of the outputs signals of the two detectors, in which the method comprises the steps of:

Prior to a use of the encoder causing the encoder to rotate through at least part of a complete revolution, Recording, for each change in state of the combined output signals, a position value indicative of the angular position of the encoder relative to a predetermined angular position datum, Determining for each change in state, the error between the recorded position and an expected ideal position, For all of the recorded positions associated with each change of state of the output signal determining a mean positional error value, Storing each of the mean positional error values in a memory.

The steps of the method may be carried out prior to the first use of the encoder, for example during manufacture, installation or commissioning. Alternative, the steps may be performed prior to each use of the encoder, for example after it is switched on.

In a still further alternative the steps may be performed during use of the encoder, so that by "prior to use" we mean that the steps are carried out some time immediately prior to generating the position signal.

The step of recording the position of each change of state relative to an ideal expected position may comprise recording the second position measurement using a secondary position measurement device. If the second device is calibrated it can be assumed that the measurements are accurate and represent the actual position.

The measurements may be taken over one complete rotation of the encoder. Therefore, each compensation value will comprise an average of several measurements for each change of state. For example, if the encoder track comprises 36 encoder poles, then each change of state will occur 36 times in each rotation and the compensation value will represent the mean of the 36 measurements for each state.

According to a third aspect the invention provide an alternative method of improving the performance of a rotary encoder of the kind comprising an annular track of at least two different encoding regions which alternate around the track, a first detector at a first fixed position which is arranged to produce a first alternating output signal as the track of encoding regions rotates about its axis past the detector, the state of the output signal depending on which of the two different encoding regions is facing the first detector;

a second detector at a second fixed position which is offset from the position of the first detector and is arranged to produce a second alternating output signal as the track of encoding regions rotates about its axis past the detector, the state of the output signal depending on which of the two different encoding regions is facing the second detector; and A processing means which generates a position signal at least in part by counting changes in the combined states of the outputs signals of the two detectors, in which the method comprises the steps of:

causing the encoder to rotate through a cycle of changes of state in which the state of the combined output signals passes once through every possible change of state, recording, for each change in state, the time at which the change of state occurs and recording the total elapsed time between a first change of state in the cycle and the next occurrence of that same change of state in the cycle.

determining from the timings a compensation value from each change of state indicative of the positional error in the change of state relative to the adjacent change of state in the sequence, determining a compensation value for the first change of state which results in the combined sum of all of the compensation values being equal to zero, and storing the compensation values in a memory for use by the encoder.

In this method, the encoder is not being calibrated by comparing the sensor output with a second sensor, but an improvement in performance is achieved by comparing the timing of changes of state across a cycle with the ideal timings. These ideal timings will depend on the known spacing between detectors and encoding regions, and as such the method "calibrates" the output against of the device against an ideal performance of the device itself.

The method is suitable for use with an encoder of the type which includes encoding regions which are spaced apart in a known, ideal, manner around the track, so that if the encoder was operating in an ideal manner the time between changes of state occurring in a cycle, when rotating at a constant velocity, would be equal. This also depends on the spacing between detectors being set correctly.

The method can be used with detectors that are not offset from one another by one half of the spacing between encoding regions, which will lead to variation in the timing between transitions. Provided the relative positions of the detectors are known this can be taken into account by the method, which can calculate ideal timings from the known spacing.

The method may comprise recording the changes of state when it is known, or assumed, that the velocity of the encoder is constant.

The compensation values may be generated from the elapsed times according to the following table of expressions:

TABLE 1

Encoder Ratio Calculation, Dependant on Direction of Rotation

| encoder state | encoder state transition | encoder adaption ratio [$E_{ST}$] |
|---|---|---|
| 0 | 2⇔0 | $((t_3 - t_4)/(t_0 - t_4)) - 0.25$ |
|   | 3⇔2 | $((t_2 - t_4)/(t_0 - t_4)) - 0.50$ |
|   | 1⇔3 | $((t_1 - t_4)/(t_0 - t_4)) - 0.75$ |
| 1 | 1⇔3 | $0.25 - ((t_3 - t_4)/(t_0 - t_4))$ |
|   | 3⇔2 | $0.50 - ((t_2 - t_4)/(t_0 - t_4))$ |
|   | 2⇔0 | $0.75 - ((t_1 - t_4)/(t_0 - t_4))$ |

Where T0, 1, 2, 3 is the time of the respective change of state, and T4 is the time that the first state change occurs for the second time.

The method may be repeated multiple times, with the stored compensation values being updated whenever a new compensation value is calculated, the step of updating comprising combining the stored value with the new compensation value so that the stored value represents an average value over time. They may be combined by applying a weighting to the stored value and new value before summing the weighted values and dividing by the sum of the weightings.

The stored values may be derived by passing them through a filter with new updated compensation values. The filter may be defined by the expression:

Updated Stored compensation value=((1−*Kf*)×current stored compensation value+(*Kf*×new compensation value)

Where Kf is the filter constant (0<Kf<=1).

The method may comprise updating the stored compensation values periodically.

The method may comprise monitoring the velocity of the encoder, and only determining new compensation values if the encoder is rotating at a velocity that is above a predetermined threshold value.

According to a fourth aspect the invention provides a rotary encoder post-processing apparatus for use with a rotary encoder of the kind comprising:

an annular track of alternating encoding regions,
a first detector at a first fixed position which is arranged to produce a first alternating output signal as the track of encoding regions rotates about its axis past the detector, the state of the output signal depending on which of the two different encoding regions is facing the first detector;
a second detector at a second fixed position which is offset from the position of the first detector and is arranged to produce a second alternating output signal as the track of encoding regions rotates about its axis past the detector, the state of the output signal depending on which of the two different encoding regions is facing the second detector;
in which the combined values of the two output signals is capable of assuming a plurality of unique states with the states changing from one to another as the encoder rotates,
in which the post processing apparatus comprises:
a memory which stores compensation values, each value being associated with a respective one of the possible state changes that can occur when the combined values of the two output signals change upon movement of the encoder track, and in which each compensation value is indicative of an average error in the position at which the corresponding change of state occurs, and
a processing means which in use generates a position signal that is updated when there is a change in the combined states of the output signals of the two detectors, the position signal being corrected by an amount indicated by the compensation value associated with the latest change in state The encoder may generate a count signal from the combined values of the two output signals, and the post processing apparatus may receive this count signal and generate the position signal by processing the count signal.

Alternatively, the encoder may output directly the two outputs signals and the post-processing means may generate a count signal when generating the position signal.

The encoder and post processing circuit may include any of the features described in relation to the first aspect of the invention and may implement the method of the second and third aspect.

According to a fifth aspect the invention provides a steering system for a vehicle comprising an encoder according to the first aspect that has been calibrated according to the method of the second aspect of method of the third aspect of the invention.

Other advantages of this invention will become apparent to those skilled in the art from the following detailed description of the preferred embodiments, when read in light of the accompanying drawings.

BRIEF DESCRIPTION OF THE DRAWINGS

FIG. 8 is a diagram showing the measured errors in position for each position of the encoder at which a change in state occurs, along with a mean error value for each set of changes of state, i.e. a mean value for all errors corresponding to change of state 0-2, a mean value for all errors corresponding to change of state 1-0 and so on;

DETAILED DESCRIPTION OF THE INVENTION

Figure 1:
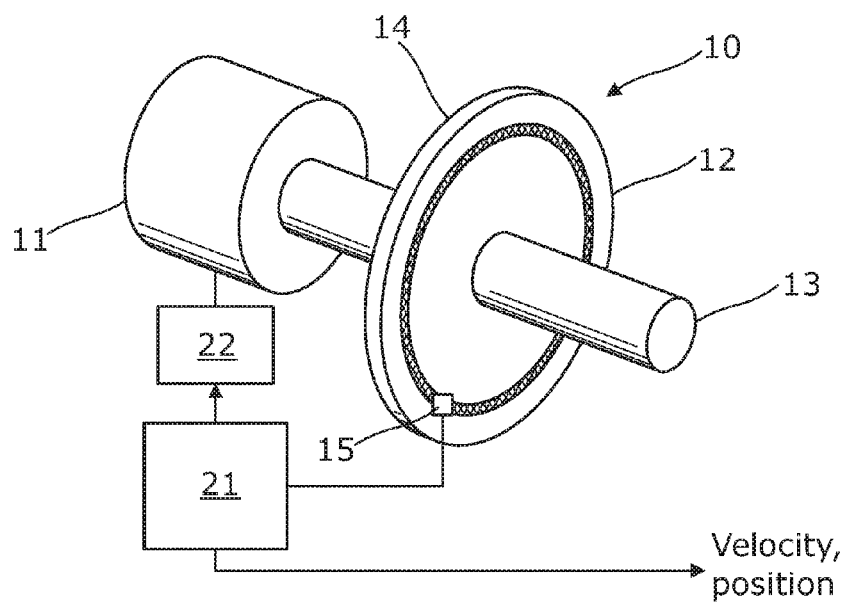
FIG. 1 is a schematic view of a steering assembly which includes an encoder in accordance with an aspect of the invention.

An electric power assisted steering system in shown in FIG. 1. The system 10 comprises an electric motor 11 that is connected to part of a steering shaft (not shown) through a gearbox or drive belt. The motor 11, in use, applies an assistance torque to the steering shaft that helps a driver to turn the steering wheel. To determine how much assistance torque is required, a torque sensor (not shown) is attached to the steering shaft and provides a torque signal to the motor controller indicative of the torque carried by the steering shaft.

The motor is a three phase AC motor which is driven by applying pulse width modulated voltage waveforms 22 from a motor controller 21 to each of the three phases. Such motors and PWM schemes are well known in the art and will not be described here in detail. Unless the motor drive scheme is one of the well known position sensorless schemes, a position sensor 12 must be provided which feeds a position signal into the motor controller 21 indicative of the angular position of the motor rotor. As shown the sensor 12 comprises a rotary encoder that is connected to the output shaft 13 of the motor 11, but could be connected to the steering shaft.

Figure 3:
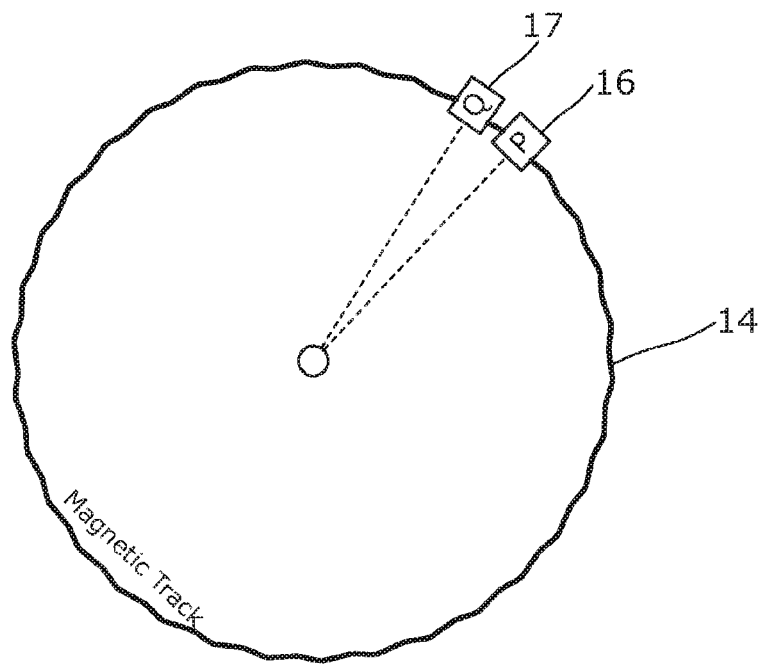
FIG. 3 is a plan view of the encoder disk of the encoder and the relative positions of the detectors.
Figure 4:
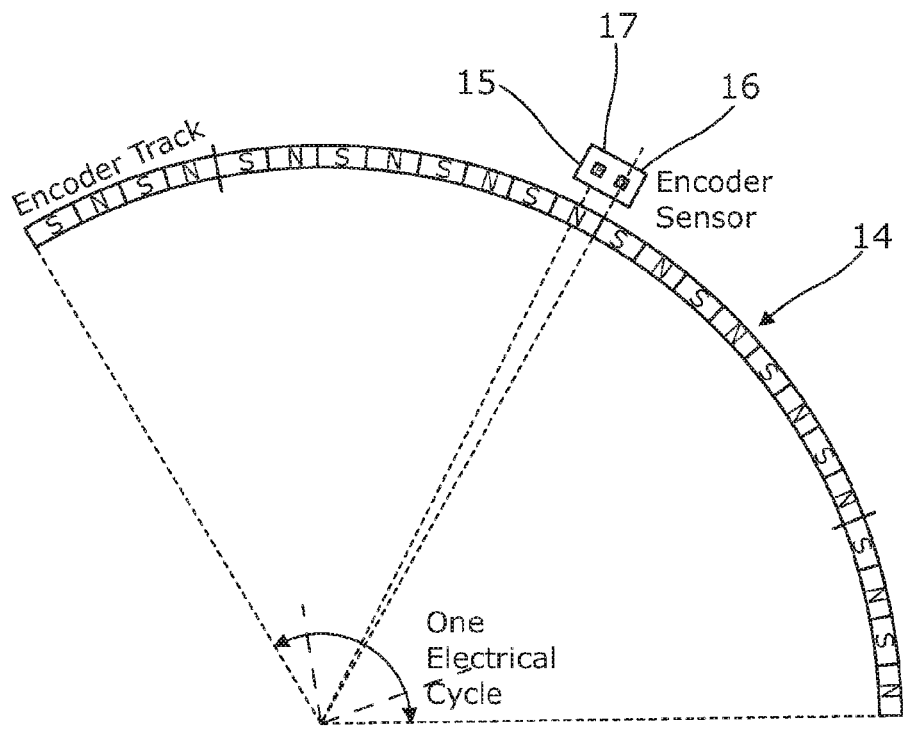
FIG. 4 is a detailed plan view of a part of the encoder of FIG. 4 showing the relative positions of the magnet poles and the detectors.

It comprises an encoder disk 14 attached to the output shaft 13 of the motor 11. The disk 14, which can also be seen in FIGS. 3 and 4, comprises Nep encoder pole magnets, in this case 36 magnet encoder poles, arranged as an alternating sequence of North and south poles. Each magnet has the same width, and the centres of each magnet are spaced from the adjacent magnets centre by 360/Nep degrees.

The encoder 12 includes a support bracket 15 that is fixed in position relative to the motor casing so that it does not move as the encoder rotates. The bracket 15 supports two sensors 16, 17 (referred to here as detectors P and Q), each one in this embodiment comprising a Hall Effect sensor. The active part of each sensor faces the magnets so that the output signal from each Hall Effect sensor will be one of two states depending on whether it "sees" a North Pole or a South Pole on the magnetic encoder track. For convenience the states in are defined here as 1 and 0. The two sensors P and Q (phase and quadrature) are offset around the circumference of the encoder track by an angular distance of ¼*360 degrees/Nep.

Figure 5:
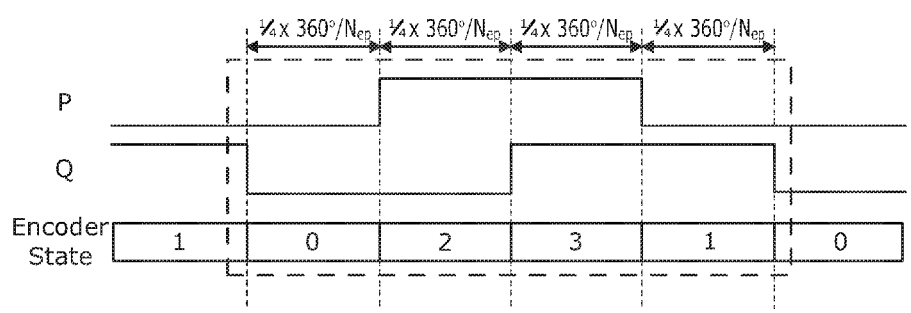
FIG. 5 is a timing diagram showing the values of the output signals from the two detectors P and Q and the corresponding four encoder states 0, 1, 2 and 3 represented by the combined output signals.

As the motor rotates the output signal from each PQ sensors change state according to the polarity of the magnetic track facing the magnets, producing the repetitive pattern pulse train as shown in FIG. 5 where the encoder changes state (the combined state of P and Q) every ¼*360/Nep degrees.

Figure 6:
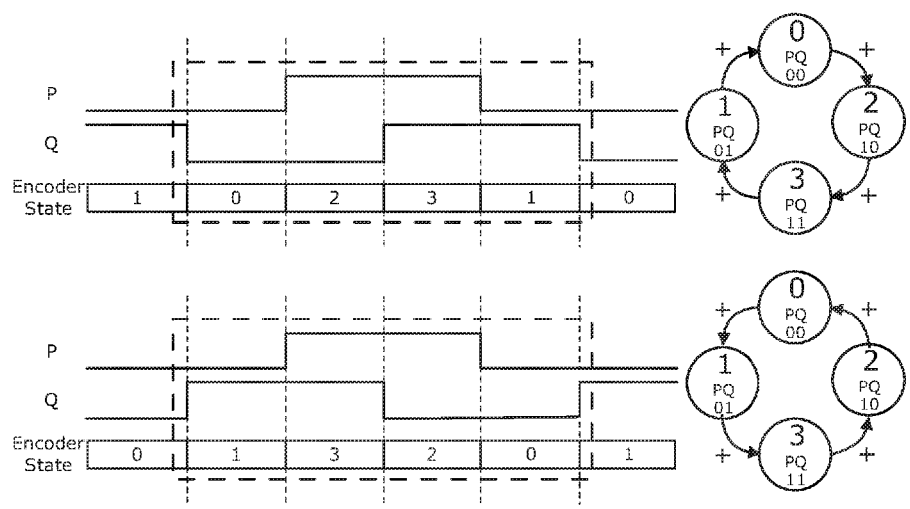
FIG. 6 shows the variation in the count signal due to the change of states, represented by the arrows, that occurs as the encoder rotates in one direction and as it rotates in the other direction.
Figure 7:
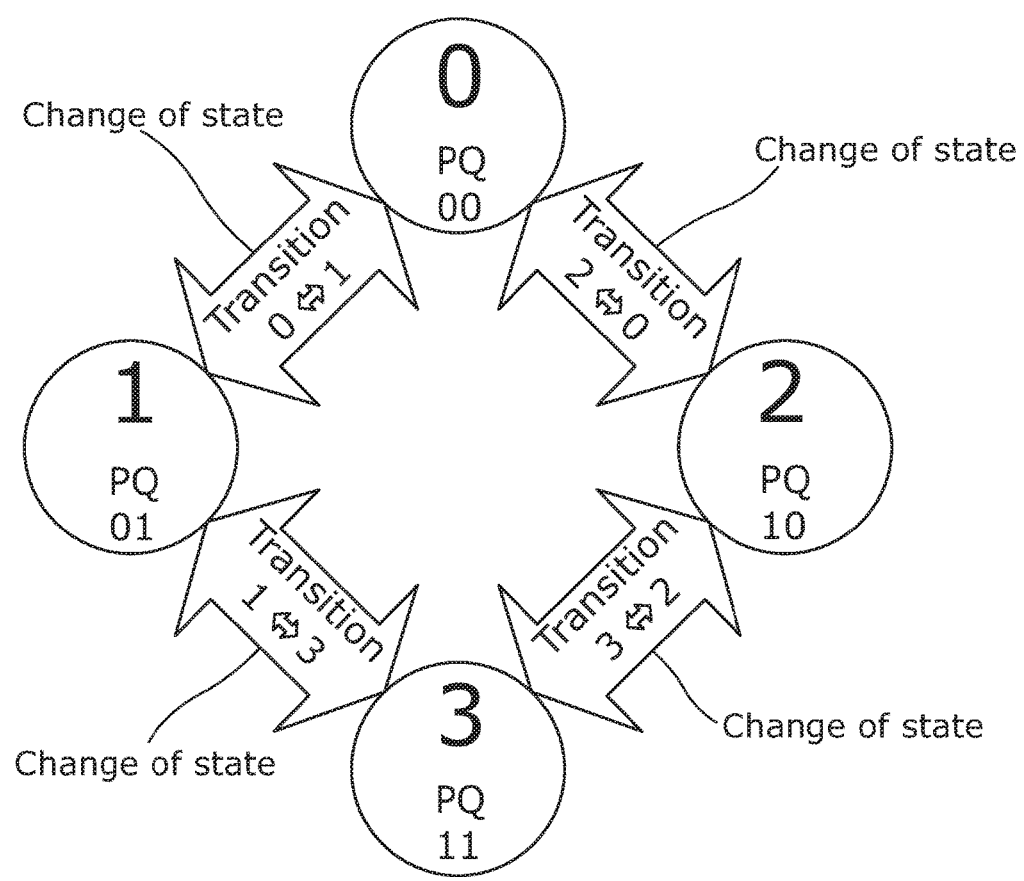
FIG. 7 is a state diagram showing by arrows the four possible changes of state as the encoder rotates.

Depending on the direction of rotation, the sensor that sees the edge of the magnetic track first changes. This can be used to determine the direction of rotation. This can also be seen in FIG. 6. The combined values of the two output signals will change between one of four possible states, the sequence of states depending on the direction of rotation of the encoder disk as shown in FIGS. 6 and 7. For convenience the states are referred to as state 0, 1, 2 and 3.

Figure 2:
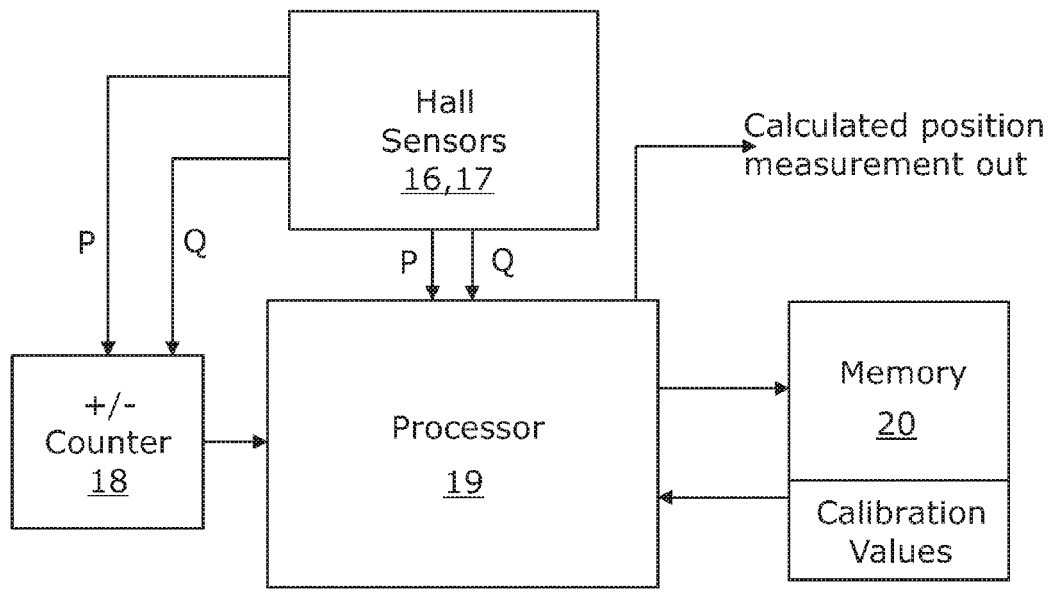
FIG. 2 is a block diagram showing the key functional components of the encoder which provide a position measurement signal to the motor controller of FIG. 1.

The position sensor is shown schematically in FIG. 2. In this example the encoder includes a counter 19 and this can be incremented/decremented according to the direction of rotation of the encoder as identified from the change of state as shown in FIG. 6. The value of the counter is used by a processor 19 as the basis for a measurement of the position of the encoder and it is this position measurement that is fed to the motor controller. In this example, as shown in FIG. 6 the position count increments for the sequence of states 0, 2, 3, 1, 0, . . . and decrements for the sequence 0, 1, 3, 2, 0, . . . but this is arbitrary and may be swapped.

In reality, the state transitions will not occur every ¼*360/Nep degrees apart, with error present due to, amongst other things, imperfections in the encoder track, magnetic interference from nearby magnetic fields, sensor switching levels and variations in the air gap between the track and the detectors. An example of this potential error can be seen in FIG. 8.

To reduce the effect of these errors, the encoder includes a memory 20 and a processor 19. This may, of course, be provided separate from the encoder as part of a post-processing apparatus, the encoder simply providing the P and Q signals and optionally producing the count. The counting could also be done by a discrete post processing circuit.

The memory 20 stores calibration values, one value for each transition in the state machine. The values are stored in a look up table which is indexed by the state changes. Each calibration value is representative of the mean error in the position of the change of state in the machine over at least a part of a complete revolution of the encoder track compared with the expected position. The processing means, upon detecting a change in state of the machine, produces a position signal that is corrected using the stored calibration value. For example, if the mean error value indicates that the location of the edge is not at the ideal position, the time at which the change occurs will be delayed by an amount equal to the store value.

The angular amount by which the change in state position is moved depends on the value stored in the memory.

Two possible ways of generating the calibration values are set out below.

Offline Calibration

Figure 8:
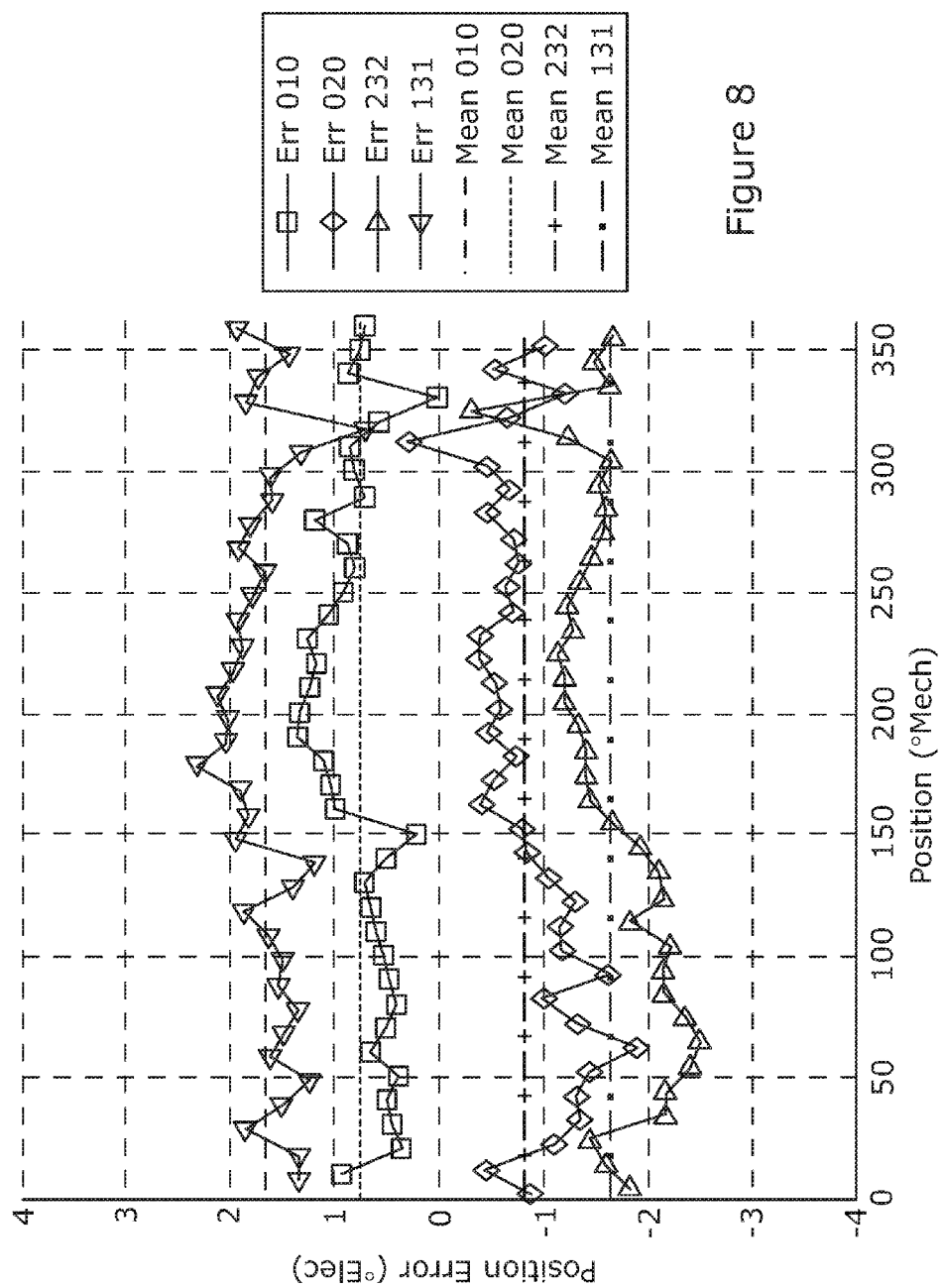
Figure 9:
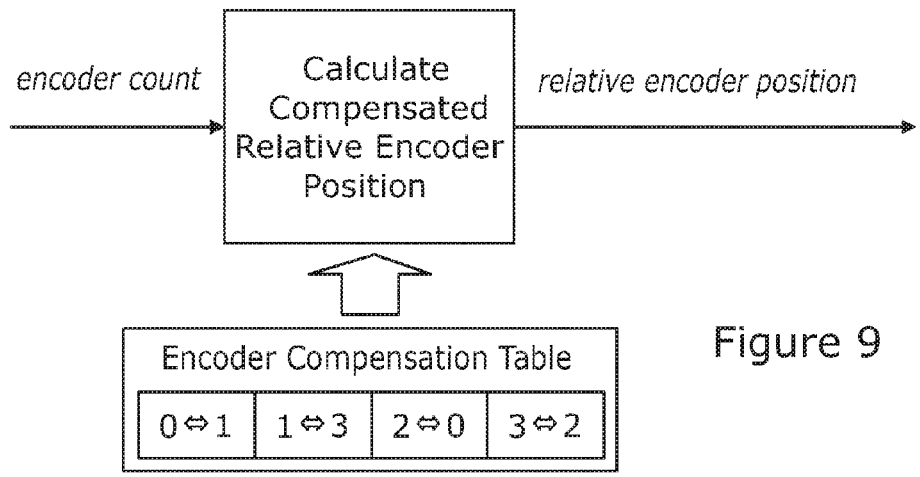
FIG. 9 is an overview of the method used to generate an encoder position value by combining a count value with the stored compensation values.

An example measurement can be seen in FIG. 8, with the individual transitions in state for the 4 encoder states over one mechanical revolution shown, along with their mean values. As we are looking at the relative change-change error any DC bias can be removed, i.e. the mean value for all states should be removed to bias around zero degrees such that:

error0< >1+error2< >0+error3< >2+error1< >3=0 where error x< >y is a stored calibration value corresponding to a change from state y to state x or a change from state x to state y.

The net effect over one mechanical revolution is 0° meaning that any alignment offset used to ensure the position sensor is aligned with the back EMF is not affected. For example if this algorithm was introduced into an existing system any position sensor alignment correction would remain valid and not require re-calibrating which would be a costly and time consuming exercise.

Figure 10:
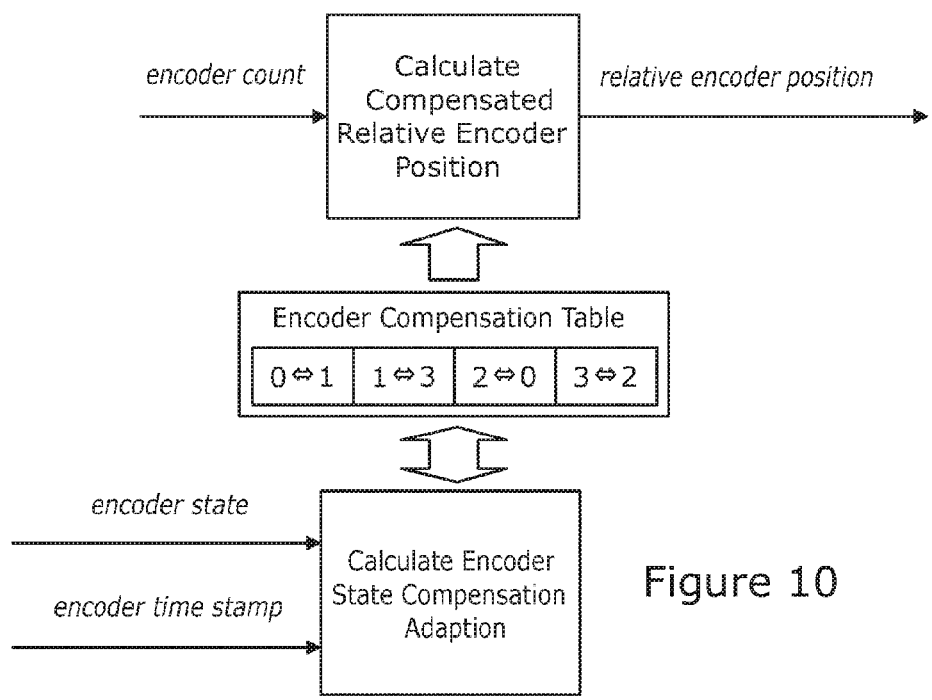
FIG. 10 is an overview similar to FIG. 10 showing the method used to update the stored values by observing the relative timing at which changes occurs.

With a set of 4 mean state transition error values the encoder position calculation can be modified to include the compensation term as shown in FIG. 10.

Note that the compensation values may be expressed in mechanical degrees or electrical degrees, e.g. for a 4 pole pair machine a mechanical error of 1° is a 4° error in the electrical reference frame. Calculation of the encoder position, where the compensation is in ° electrical, for a motor with Np pole pairs is:

encoder position=MOD 360(encoder count×360°× Np/(4×Nep))+encoder state compensation where encoder state compensation is extracted from ENCODER COMPENSATION TABLE based on the latest change in state.

Online Calibration

Figure 11:
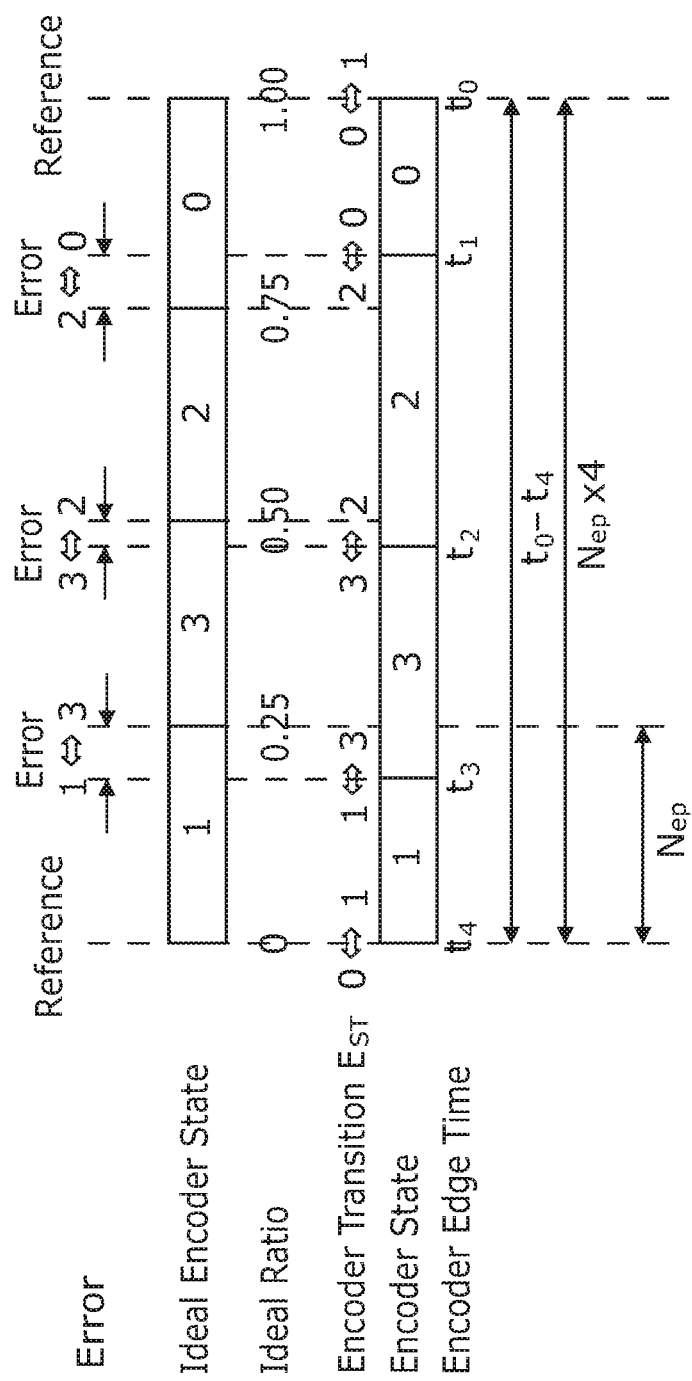
FIG. 11 is a timing diagram showing the ideal positions of encoder state changes, the actual positions of encoder edges in an imperfect encoder, and the effect of errors in the relative positions on the timings at which the states change over a full cycle of encoded state change.
Figure 12:
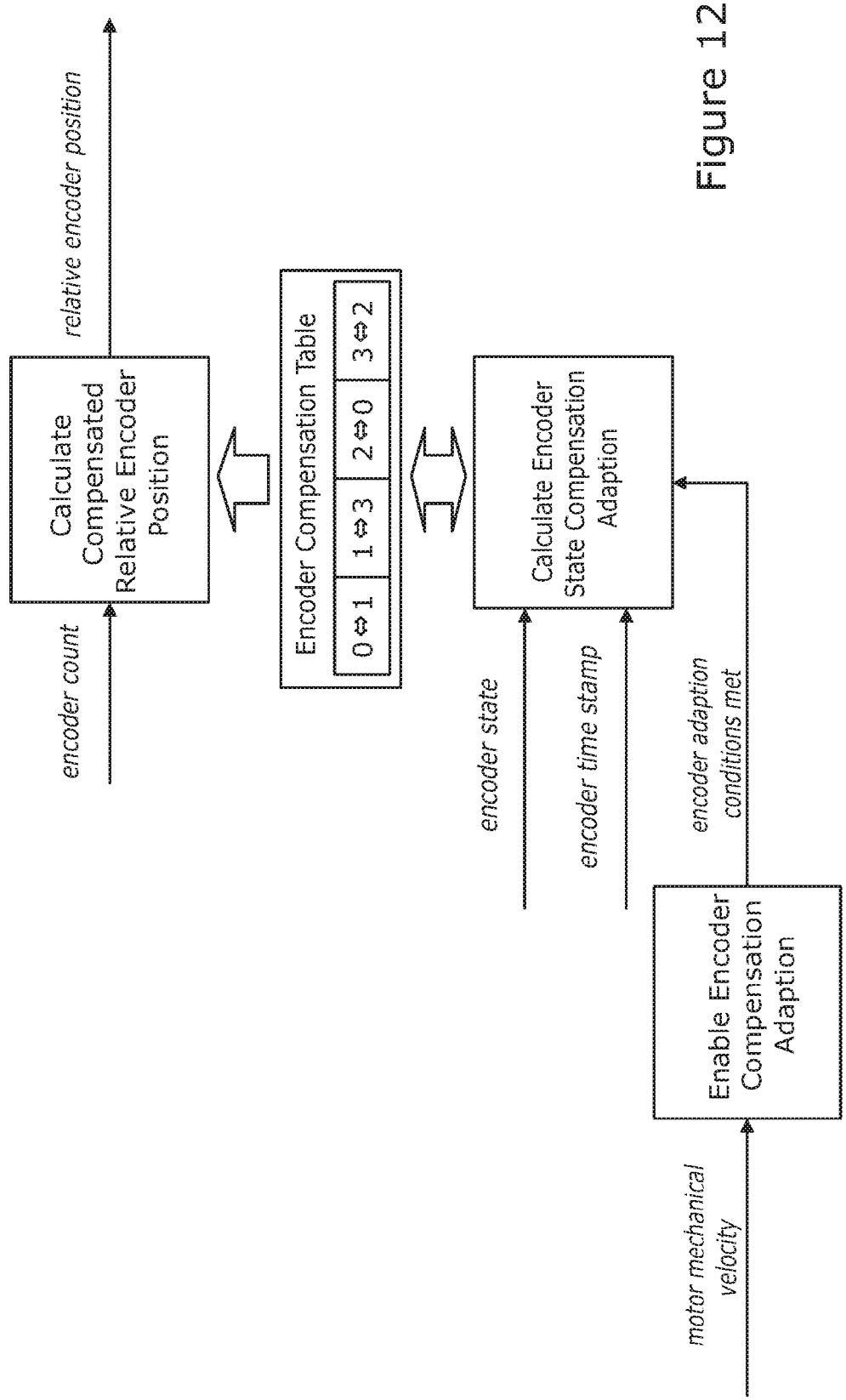
FIG. 12 is a diagram illustrating an alternative off-line compensation algorithm that includes an adaptive calculation to learn the offsets during normal operation rather than off-line.

An alternative to offline calibration against a second sensor is to calculate the mean compensation during the normal operation of the motor. This is achieved by modifying the off-line compensation algorithm to include an adaptive calculation to learn the offsets during normal operation rather than off-line. Rather than observing the absolute positions at which changes occur, the relative positions of changes in a sequence are used. The modified algorithm is as shown in FIGS. 11 and 12.

The adaption algorithm may be executed once per cycle of the encoder state machine. One state transition is chosen as the reference transition, the choice is arbitrary but in this case 0_1 has been chosen. It may be executed for every cycle (a cycle comprising a full sequence in which every state change occurs once only), or may be performed periodically (either at preset time intervals, or when preset conditions are met, or at random or pseudo-random intervals of time).

The adaption principle is summarised in FIG. 10 and is used as the basis of the description of the algorithm.

At the end of a cycle, on the reference change of state, transition (0_1), the timing information for the previous 4 encoder state transitions are used to estimate the errors in position for each of the state transitions. An ideal encoder has equidistant edges; in reality this is not the case and edge-to-edge errors occur where the states are not uniform in size. Assuming for one cycle of the encoder states the velocity is constant (which over the small angular distance of one encoder cycles is probable) then the edges should occur uniformly at 0, 0.25, 0.50, 0.75 and 1.0 over the cycle, where 0 and 1.0 are the same reference state transition.

By capturing the transition times over this period the equivalent edge positions can be estimated and the edge-to-edge error (compensation) terms calculated, i.e. the timing error can be expressed as a ratio of the overall time (t0-t4). This ratio can then be expressed as a position error scaled to the overall distance rotated (Nep×4). Depending on the direction of rotation the state after the 0_1 reference transition will be either 0 or 1. The ratio values for the 3 states are different depending on direction of rotation (see FIG. 3), and are summarised in Table 1 where EST is encoder state transition 2_0, 3_2 or 1_3.

TABLE 1

Encoder Ratio Calculation, Dependant on Direction of Rotation

| encoder state | encoder state transition | encoder adaption ratio [$E_{ST}$] |
|---|---|---|
| 0 | 2⇔0 | $((t_3 - t_4)/(t_0 - t_4)) - 0.25$ |
|   | 3⇔2 | $((t_2 - t_4)/(t_0 - t_4)) - 0.50$ |
|   | 1⇔3 | $((t_1 - t_4)/(t_0 - t_4)) - 0.75$ |
| 1 | 1⇔3 | $0.25 - ((t_3 - t_4)/(t_0 - t_4))$ |
|   | 3⇔2 | $0.50 - ((t_2 - t_4)/(t_0 - t_4))$ |
|   | 2⇔0 | $0.75 - ((t_1 - t_4)/(t_0 - t_4))$ |

The adaption ratio can then be used to calculate the error (compensation) values:

error[EST]=encoder adaption ratio[EST]×(Nep×4)

These error terms are stored in ENCODER COMPENSATION TABLE. The compensation terms for a particular encoder will be fixed. For robustness the update of the ENCODER COMPENSATION TABLE may be filtered to reduce the effects of measurement error in the edge timing, e.g.

ENCODER COMPENSATION TABLE[EST]=((1−Kf)×ENCODER COMPENSATION TABLE [EST])+(Kf×error[EST])

Where Kf is the filter constant (0<Kf<=1)

As with the off-line calibration the net effect of the compensation should be zero to avoid the introduction of a position offset. This information can be used to calculate the correct value for the reference transition:

ENCODER COMPENSATION TABLE [0_1]=−(ENCODER COMPENSATION TABLE [2_0]+ENCODER COMPENSATION TABLE [3_2]+ENCODER COMPENSATION TABLE [1_3])

As with the off-line algorithm the compensation is applied based on the latest encoder state transition:

encoder position=MOD 360(encoder count×360×Np/4×Nep)+encoder state compensation where encoder state compensation is extracted from ENCODER COMPENSATION TABLE, based on the latest state transition.

Limit Adaption Conditions

To successfully adapt the motor must be rotating; at zero speed it is not possible to adapt. It is advantageous to limit the speed range over which the adaption algorithm operates, disabling the adaption when the speed drops below a specified threshold. Similarly it may be advantageous to disable the adaption above an upper speed threshold. Hysteresis may be applied to these thresholds to minimise jittering in and out of adaption.

Whilst the invention has been described in detail based on an encoder with encoding regions formed by alternating North and South poles, other encoding regions could be used with the scope of the invention. For example, the encoding regions could comprise regions of varying transmittance or reflectivity, perhaps of varying colour, and the detectors may comprise optical detectors. A transition will occur as the regions move past the detector and the detector sees a change in reflectance of colour. A light source may be provided as part of the encoder that directs light onto the encoding regions where it can be reflected back towards the detector, or direct light onto the back of the encoding regions where it may be partially transmitted through the encoding regions onto the detector or blocked by the encoding regions. Significantly, there must be at least two different types of encoding regions in order for the full set of four state changes to be identified with two detectors.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A rotary encoder assembly comprising:
   an annular track comprising an alternating pattern of at least two different encoding regions;
   a first detector at a first fixed position which is arranged to produce a first alternating output signal as the track of encoding regions rotates about an axis past the detector, the state of the output signal depending on which of the two different encoding regions is facing the first detector;
   a second detector at a second fixed position which is offset from the position of the first detector and is arranged to produce a second alternating output signal as the track of encoding regions rotates about the axis past the detector, the state of the output signal depending on which of the two different encoding regions is facing the second detector;
   in which the combined values of the two output signals is capable of assuming a plurality of unique states with the states changing from one to another as the encoder rotates,
   a memory which stores compensation values, each value being associated with a respective one of the possible state changes that can occur when the combined values of the two output signals change upon movement of the encoder track, and in which each compensation value is indicative of an average error in the position at which the corresponding change of state occurs, a processing means which in use generates a position signal that is updated when there is a change in the combined states of the output signals of the two detectors, the position signal being corrected by an amount indicated by the compensation value associated with the latest change in state; and means of updating the stored compensation values based on the relative timing of each change of state.

2. The rotary encoder assembly according to claim 1 in which each stored compensation value is derived from observing multiple instances of the corresponding change of state of the combined output signals from the two detectors, the multiple observations being combined to provide an arithmetic average value that is stored as the compensation value.

3. The rotary encoder assembly according to claim 1 in which each stored compensation value is indicative of the error in the relative position of a state change to the position of one state change which is chosen as a reference change in state.

4. The rotary encoder assembly according to claim 1 wherein the means of updating the stored compensation values is configured to perform the steps of:

recording the relative timing at which each change in state in a complete cycle of changes of state occurs, a cycle corresponding to each state changing at least once, determining the total time taken for all changes to occur starting with a first change in state and ending when that first change in state occurs again, determining the fraction of that total time between each change in state, deriving a compensation value for each change in state apart from the first change in state based on the fraction and the total elapsed time; and subsequently determining an intermediate compensation value for the first change in state which results in the sum of all of the compensation values being equal to zero.

5. The rotary encoder assembly according to claim 4 in which the processing means is arranged to update the stored compensation values by combining them with the intermediate compensation value.

6. The rotary encoder assembly according to claim 5 in which the processing means is arranged to perform the update when the encoder is rotating above a minimum threshold angular velocity.

7. The rotary encoder assembly according to claim 1 in which the processor is adapted to increment the position signal in the event that a change of state occurs which is associated with rotation of the encoder in a first direction, and adapted to decrement the position signal when a change of state occurs that is associated with rotation is a second, opposite, direction.

8. The rotary encoder assembly according to claim 1 in which the encoding regions of the encoder are each be defined by a pole of a magnet, the poles being arranged as an alternating pattern of north and south poles.

9. A steering system for a vehicle comprising a rotary encoder which is adapted to monitor the angular position of an electric motor of the steering system, the rotary encoder apparatus being as recited in claim 1.

10. The rotary encoder assembly according to claim 5 in which the update comprises forming a weighted sum of the stored value and the intermediate value.

11. A method of calibrating a rotary encoder of the kind comprising an annular track of at least two different encoding regions which alternate around the track, a first detector at a first fixed position which is arranged to produce a first alternating output signal as the track of encoding regions rotates about an axis past the detector, the state of the output signal depending on which of the two different encoding regions is facing the first detector;

a second detector at a second fixed position which is offset from the position of the first detector and is arranged to produce a second alternating output signal as the track of encoding regions rotates about the axis past the detector, the state of the output signal depending on which of the two different encoding regions is facing the second detector; and a processing means which generates a position signal at least in part by counting changes in the combined states of the outputs signals of the two detectors, in which the method comprises the steps of:

prior to a use of the encoder causing the encoder to rotate through at least part of a complete revolution, recording, for each change in state of the combined output signals, a position value indicative of the angular position of the encoder relative to a predetermined angular position datum, determining for each change in state, the error between the recorded position and an expected ideal position, for all of the recorded positions associated with each change of state of the output signal determining a mean positional error value, and storing each of the mean positional error values in a memory; and updating the mean positional error values based on the relative timing of each change of state.

12. The method according to claim 11 in which the steps of the method are be carried out prior to the first use of the encoder during manufacture, installation or commissioning of the rotary encoder.

13. The method according to claim 11 in which the steps are performed during use of the encoder to measure position.

14. The method according to claim 11 in which the step of recording the position of each change of state relative to an ideal expected position comprises recording the second position measurement using a secondary position measurement device.

15. The method according to claim 11 in which the measurements are taken over one complete rotation of the encoder so that each compensation value will comprise an average of several measurements for each change of state.

16. A steering system for a vehicle comprising a rotary encoder which is adapted to monitor the angular position of an electric motor of the steering system, the rotary encoder apparatus being calibrated to the method of claim 11.

17. A rotary encoder post-processing apparatus for use with a rotary encoder of the kind comprising:

an annular track comprising an alternating pattern of at least two different encoding regions;

a first detector at a first fixed position which is arranged to produce a first alternating output signal as the track of encoding regions rotates about an axis past the detector, the state of the output signal depending on which of the two different encoding regions is facing the first detector;

a second detector at a second fixed position which is offset from the position of the first detector and is arranged to produce a second alternating output signal as the track of encoding regions rotates about the axis past the detector, the state of the output signal depending on which of the two different encoding regions is facing the second detector;

in which the combined values of the two output signals is capable of assuming a plurality of unique states with the states changing from one to another as the encoder rotates, in which the post processing apparatus comprises:

a memory which stores compensation values, each value being associated with a respective one of the possible state changes that can occur when the combined values of the two output signals change upon movement of the encoder track, and in which each compensation value is indicative of an average error in the position at which the corresponding change of state occurs, a processing means which in use generates a position signal that is updated when there is a change in the combined states of the output signals of the two detectors, the position signal being corrected by an amount indicated by the compensation value associated with the latest change in state; and means of updating the stored compensation values based on the relative timing of each change of state.

18. The rotary encoder post processing apparatus according to claim 17 in which the encoder generates a count signal from the combined values of the two output signals, and the post processing apparatus receives this count signal and generate the position signal by processing the count signal.

19. The rotary encoder post processing apparatus according to claim 17 in which the encoder outputs directly the two outputs signals and the post-processing means generates a count signal when generating the position signal.

* * * * *